United States Patent
Meiling et al.

(10) Patent No.: US 7,324,477 B2
(45) Date of Patent: Jan. 29, 2008

(54) METHOD FOR ALLOCATING CHANNELS IN A RADIO COMMUNICATIONS SYSTEM

(75) Inventors: Axel Meiling, Berlin (DE); Marcus Purat, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 613 days.

(21) Appl. No.: 10/478,985

(22) PCT Filed: May 21, 2002

(86) PCT No.: PCT/DE02/01820

§ 371 (c)(1),
(2), (4) Date: Jun. 1, 2004

(87) PCT Pub. No.: WO02/096143

PCT Pub. Date: Nov. 28, 2002

(65) Prior Publication Data

US 2004/0213175 A1    Oct. 28, 2004

(30) Foreign Application Priority Data

May 21, 2001   (DE) .................................. 101 24 765

(51) Int. Cl.
*H04Q 7/00* (2006.01)

(52) U.S. Cl. .................. 370/330; 370/336; 370/345

(58) Field of Classification Search ............... 370/329, 370/330, 336, 337, 345; 455/451, 452.1, 455/452.2

See application file for complete search history.

(56) References Cited

U.S. PATENT DOCUMENTS 6,711,177 B1 * 3/2004 Young ........................ 370/468
2002/0145988 A1 * 10/2002 Dahlman et al. ........... 370/335

FOREIGN PATENT DOCUMENTS

| DE | 198 55 194 | 6/2000 |
| DE | 198 56 834 | 6/2000 |
| EP | 1 006 692  | 6/2000 |
| EP | 1 006 740  | 6/2000 |

OTHER PUBLICATIONS

XP-002164238—3$^{rd}$ Generation Partnership Project; Technical Specification Group Radio Access, Network, Radio Interface Protocol Architecture—pp. 1-48, Dec. 1999.

* cited by examiner

*Primary Examiner*—Lee Nguyen
(74) *Attorney, Agent, or Firm*—Bell, Boyd & Lloyd

(57) ABSTRACT

A method is provided for use in a radio communications system according to which a channel which can be mutually used by a number of subscriber stations, consists of at least two channels that can be allocated to a number of parallelly existing connections for temporally successive use. The channels are structured according to a sequence known to the subscriber stations. A number of channels or a data rate is assigned to a subscriber station by using a subscriber individual signaling message. In addition, a starting point and/or a direction in the sequence is signaled to the subscriber station order to select the channels.

10 Claims, 5 Drawing Sheets

METHOD FOR ALLOCATING CHANNELS IN A RADIO COMMUNICATIONS SYSTEM

BACKGROUND OF THE INVENTION

The present invention relates to a method for allocating channels in a radio communications system; in particular, in mobile radio systems designated as the UMTS (Universal Mobile Telecommunications System) with a broadband radio interface. The present invention also relates to a base station system, a subscriber station and a radio communications system for implementing the method according to the present invention.

In radio communications systems, data is transferred using electromagnetic waves via a radio interface. The radio interface relates to a connection between a base station and subscriber stations, whereby the subscriber stations can be mobile stations or fixed radio stations. The electromagnetic waves are thereby emitted with carrier frequencies, which are located within the frequency band provided for the system in question. For future radio communications systems, such as the UMTS or other $3^{rd}$ generation systems, frequencies in the frequency band of approximately 2000 MHz are provided, whereby the bandwidth of a channel is 5 MHz.

Unlike systems such as the GSM (Global System for Mobile communications), a number of services that also have to be transmitted in parallel are provided for in the UMTS. In patent specifications EP 98 122 719 and DE 198 55 194, possibilities are disclosed for signaling the transport formats of the combination of data of a number of services. The data of a number of services of one connection is thereby transferred via a mutually-used physical channel.

The use of mutually-used physical channels for the transfer of data of a number of services of a connection to a subscriber station presupposes that a unique mapping specification sets out the assignment of the services to different segments of the physical channel. A physical channel is, for example, defined by a frequency band and a spread code (CDMA Code Division Multiple Access) within a frame.

The following terms are generally used to describe the mapping specification:

Transport Format (TF):

A transport format defines a data rate, coding, interleaving, data rate adjustment by dotting and an error protection specification of a transport channel for a service.

Transport Format Set (TFS):

This designates a set of possible transport formats, which are permitted for a specific service.

Transport Format Combination (TFC):

This term specifies a possible combination of transport formats of the different services, which are mapped onto a shared physical channel.

Transport Format Combination Set (TFCS):

This designates a set of possible TFCs as a subgroup of all TFCs, which are permitted for a specific connection.

Transport Format Combination Identifier (TFCI):

This information specifies the combination of transport formats in current use within the TFCS.

In order for it to be possible to select the currently used combination of transport formats of the different services as required, it is necessary to be able to modify the TFC and, therefore, to signal the TFCI in a regular manner. However, such signaling disadvantageously ties up transfer capacity.

The larger the number of possible combination options (TFCS) the more capacity is required for signaling.

With the broadband CDMA system selected for the FDD (Frequency Division Duplex) mode of the UMTS, the problem occurs during transmission from the base station to the subscriber station in the downward direction (downlink) that the number of simultaneously useable orthogonal spread codes is limited and the support of variable data rates is thereby hampered. It is, therefore, not possible with higher traffic densities in the system to assign as many dedicated channels (DCH) (i.e., those used exclusively by the subscriber station), to all subscriber stations, as these might require for transfer at their maximum respective data rates.

For this reason, what are known as shared channels are defined in the downward direction (DSCH Downlink Shared Channel); see also, ETSI SMG2 UMTS-L1, Tdoc SMG2 UMTS-L1 559/98, dated 9 Nov. 1998. The shared channels are created within the broadband frequency band via spread codes, which are temporarily assigned to different connections or subscriber stations for the period of one or a number of frames, respectively. However, the problem then arises of how it can be signaled to a subscriber station with minimum outlay whether and if so in which of these shared channels information is transferred for the subscriber station.

It is also known from ETSI SMG2 UMTS-L1, Tdoc SMG2 UMTS-L1 559/98, dated 9 Nov. 1998, that the data rates for the services transmitted in the time multiplex are signaled via the TFCI parameter, which is transferred during each frame as part of the control information; i.e., in-band. To ensure the fast allocation of shared channels, an explicit signaling is proposed which uses a specific number of TFCI bits solely to display a specific spread code (see penultimate page of the cited document).

This solution has the disadvantage that for a given number of TFCI bits the number of combination options for service transport formats is significantly restricted, which has an adverse effect on flexibility for the transfer of variable data rates.

It is also known in this context from DE 198 56 834 A1 that the shared channels used are signaled implicitly via the data rate and that a number of combinations of channels is permitted as an alternative only with specific data rates of the individual services.

In the case of a dedicated connection, it is established which resources are available at the start of the connection. As the data rate generally is not constant over the entire duration of the connection, with the known methods the current data rate is signaled separately for each allocation period. With the UMTS, the allocation period corresponds, for example, to what is known as the TTI (Transmission Time Interval). The subscriber derives the resources currently in use from such data rate.

Example: The data rate of the connection is established at 100 kB maximum and the resources 0-19 are, therefore, allocated to the subscriber. If the data rate then drops briefly to 50 kB, only the resources 0-9 are used. The remaining resources remain unused for this period.

In the case of mutually used resources, it must be established for each transfer which subscriber is permitted to use which resources. There are a number of possibilities here:

1. Only one subscriber can use all the resources in each instance. Subscribers would, therefore, be able to access the resources only according to a time-multiplex method. If a subscriber receives only a small quantity of data, the remaining resources would be unused.
2. Each subscriber is specifically informed which resources they are allowed to use. Example: Subscriber (TN) 1 uses resource 0-3, TN 2 resource 4 and 8, TN 3 resource 5 and 12-36. This method offers a high level of flexibility but has the disadvantage that a large number of bits have to be signaled.

3. There are also various gradations between the methods for possibilities 1 and 2.

With all the methods disclosed, the resource information is forwarded specifically to the subscribers. The current data rate is also transferred in parallel to each subscriber. This disadvantageously results in a large signaling load.

Additional features and advantages of the present invention are described in, and will be apparent from, the following Detailed Description of the Invention and the Figures.

SUMMARY OF THE INVENTION

Accordingly the present invention is directed toward configuring the signaling of the channels used in a shared channel so that only the number of channels or the data rate, as well as the starting point and/or direction, are signaled to the subscriber station. This can take place, for example, via a bit in the disclosed TFCI signaling message, whereby the binary statuses show whether the subscriber station should select channels upwards or downwards in the channel sequence. The data rate is signaled in-band, whereby this information about the data rate does not have to be contained in full in each frame. Information from the connection context or from previous frames equally can be used to determine the data rate.

The relationship between allocated data rate and channels to be used in the shared channel is agreed in a separate signaling channel, so that the selected combination of channels including one or a number of shared channels is derivable for the receiver from the respective value of the TFCI parameter. Such signaling of the relationship (or mapping specification for the TFCI values onto specified combinations of transport formats) advantageously takes place as the connection is being set up between the base station and the subscriber station.

Additional features and advantages of the present invention are described in, and will be apparent from, the following Detailed Description of the Invention and the Figures.

DETAILED DESCRIPTION OF THE INVENTION

Figure 1:
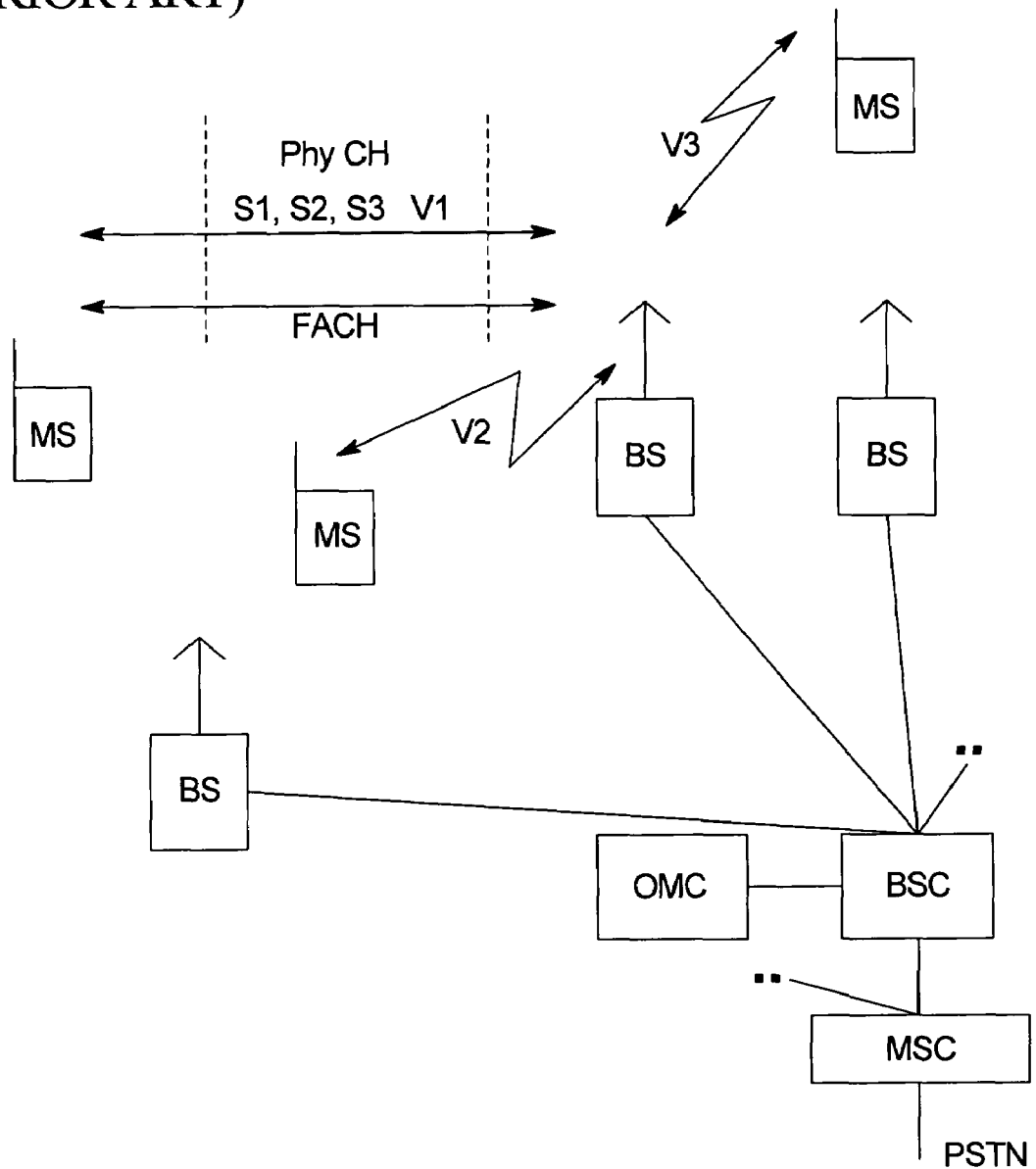
FIG. 1 shows a schematic representation of a radio communications system.

The mobile radio system shown in FIG. 1 as an example of a radio communications system, includes a number of mobile switching centers MSC, which are networked together and provide access to a fixed network PSTN (Public Switched Telephone Network). Each of the mobile switching centers MSC is also connected to at least one device RNM (Radio Network Management) to control transfer resources. Each of the devices RNM, in turn, allows a connection to at least one base station BS.

A base station BS can set up a connection to subscriber stations; (e.g., mobile stations MS or other mobile and stationary terminals) via a radio interface. Each base station BS forms at least one radio cell. FIG. 1. shows connections for the transfer of useful information between a base station BS and mobile stations MS. Within a connection V1, data of three services S (S1, S2, S3), for example, is transferred within one or a number of physical channels Phy CH and signaling information; (e.g., the assigned radio resources for a connection V1), is transferred via a Forward link Access Channel (FACH).

An operation and maintenance center OMC implements control and maintenance functions for the mobile radio system or for parts of it. The functionality of this structure can be transferred to other radio communications systems, in which the present invention can be deployed, particularly for subscriber access networks with wireless subscriber links.

In the radio communications system according to FIG. 1, transfer parts and signaling parts, which communicate with each other, are provided in both the base station BS and the mobile stations MS. The transfer parts are used to transfer data of a combination of a number of services S via the currently available physical channels Phy CH. The physical channels Phy CH can be configured as dedicated channels DCH (i.e., used exclusively by one connection, or as shared channels DSCH (i.e., used alternately or in parallel by different connections V1, V2). A distinction should be made therefore, between physical channels Phy CH used mutually by a number of services S1, S2, S3 of a connection V1 and shared channels DSCH which are assigned to a number of connections. The allocation of a shared channel DSCH can be modified very quickly from frame to frame without additional signaling outlay.

The signaling parts determine TFCI values for the selected combinations of transport formats TF for the services S1, S2, S3 and implement in-band signaling of the transport formats TF. The mapping specification of TFCI value to combination of transport formats TF and used channels DCH, DSCH is signaled in the separate channel FACH.

Figure 4:
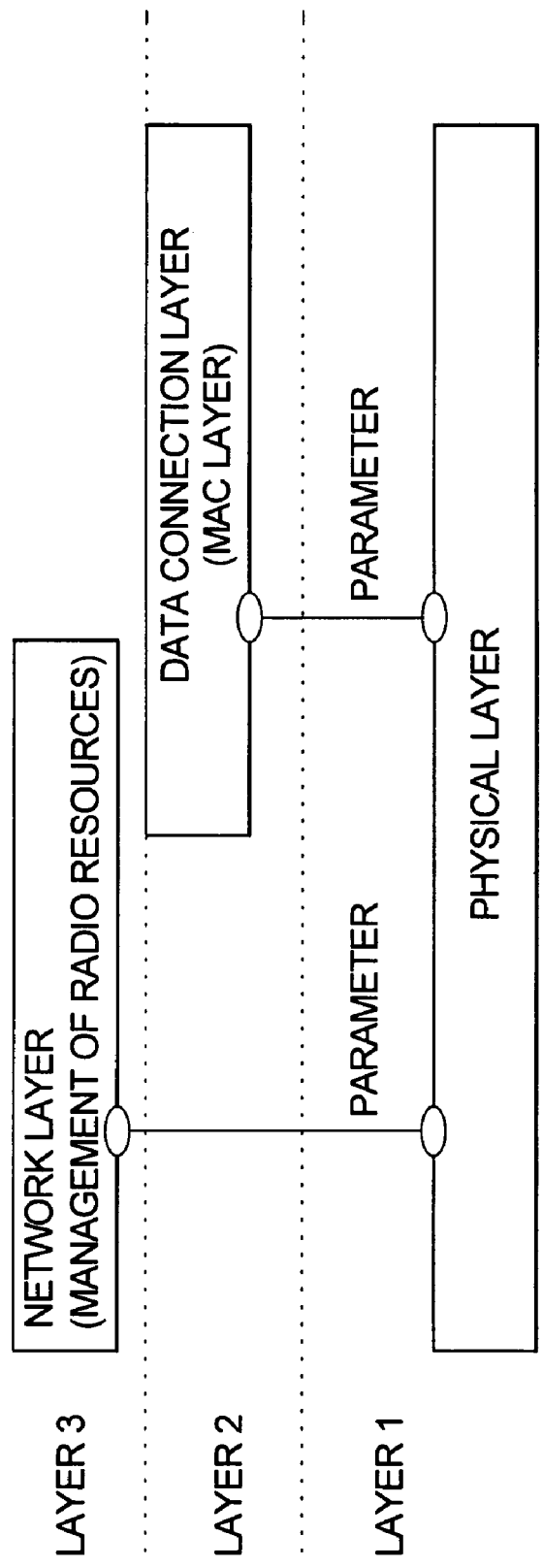
FIG. 4 shows a layer model of the transfer protocols.

The layer model according to FIG. 4 shows the division of the radio communications system protocols into three layers.

Layer 1: physical layer for writing in all bit transmission functions via a physical medium (e.g., coding, modulation, transmission power control, synchronization, etc.).

Layer 2: Data connection layer for writing in data mapping onto the physical layer and its control.

Layer 3: Network layer for controlling the radio interface resources.

The TFCS for a connection is established in layer 3, while in layer 2 a combination (a TFC) is selected, which is signaled in-band via a TFCI as shown later.

The parameter exchange between layers 1 and 2 supports the functions of a transfer of frames with data from layer 2 via the radio interface and the display of the status of layer 1 to higher layers. The parameter exchange between layers 1 and 3 supports control of the transfer configuration in layer 1 and generates system information about layer 1.

The mapping of the data of different connections S into a shared physical channel Phy CH and the signaling of the assignment of a shared channel DSCH hereby correspond to the interaction of layers 1 and 2.

Figure 2:
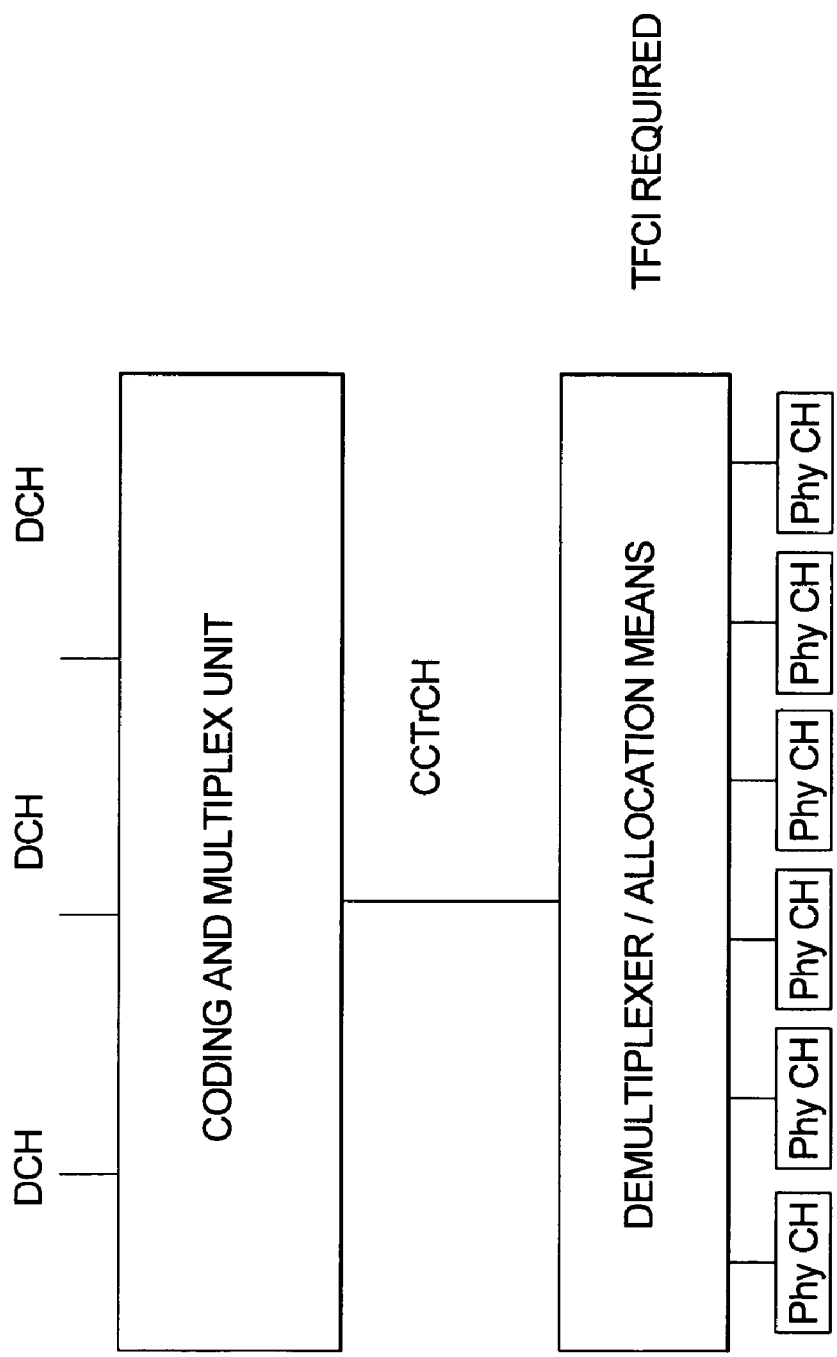
FIGS. 2, 3 show the mapping of data of different services onto mutually used physical channels.

According to FIG. 2 and, the need results for the signaling of transport formats TF for currently transferred services.

FIG. 2 shows a functional representation of a coding and multiplex unit which maps the data from a number of data channels DCH, corresponding in each instance to the data of a service S1, S2, S3, onto a coded shared transport channel CCTrCH. Such mapping specifies the bit pattern according to which the data is input into a serial data sequence. A demultiplexer/allocation part distributes the data of the coded shared transport channel CCTrCH to a number of physical channels Phy CH. Data of a number of services S1, S2, S3 is, therefore, constantly transferred in each instance via the physical channels Phy CH. No physical channel Phy CH is assigned to one service S1 or S2 or S3 alone, but to the coded shared transport channel CCTrCH with all its services S1, S2, S3.

As the receiving side has to reconstruct such mapping and read the data out of the physical channels Phy CH and display it again in the separate transport channels DCH of the services, signaling is necessary. This signaling in the form of TFCI values shows the currently used combination of transport formats TF of the services and, as shown later, the current allocation of a shared channel or a number of shared channels DSCH. The combinations permitted for the connection (TFCS) were agreed upon as the connection was set up.

There are two possibilities in the relationship between data rate and service combination (see also EP 98 122 719):
1. Each data rate corresponds precisely to a combination of transport formats TF.
2. A number of combinations of transport formats TF is possible per data rate and are differentiated via TFCI values.

Figure 3:
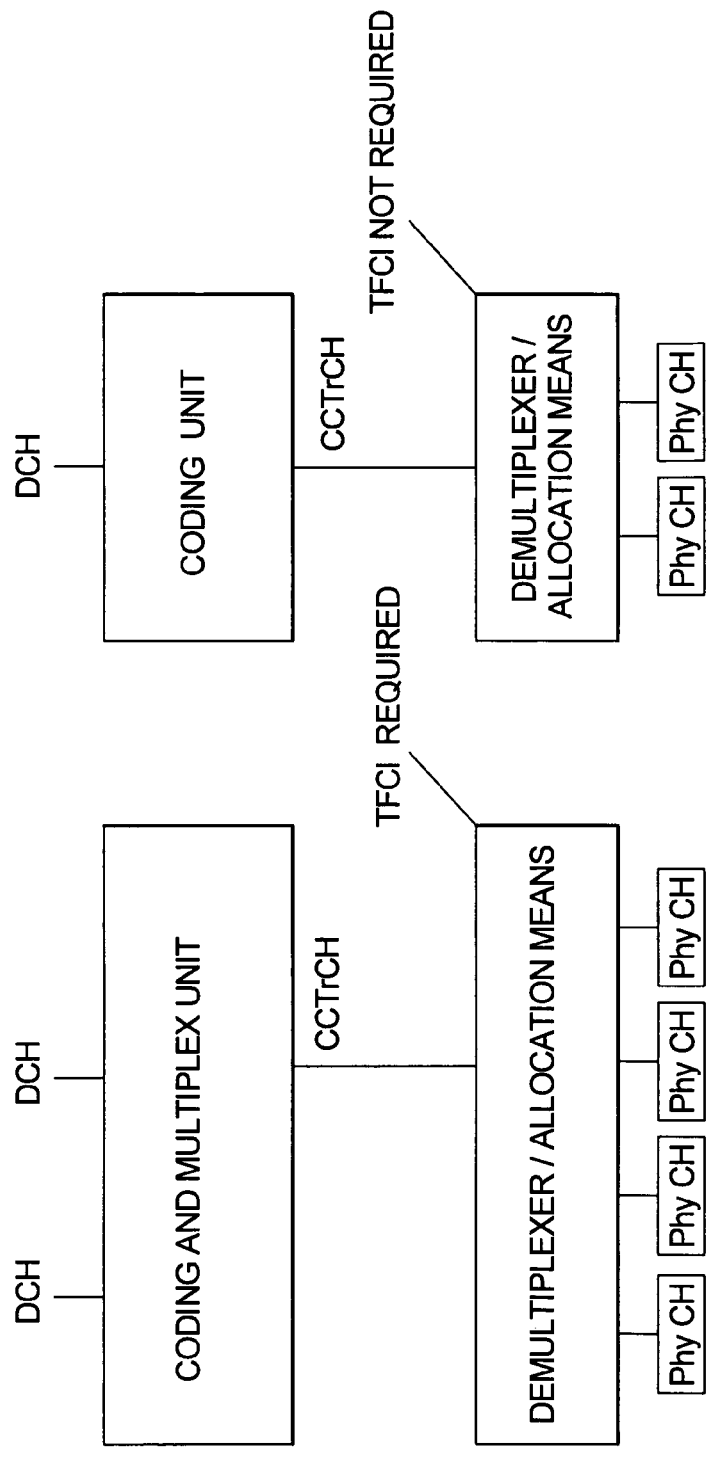

FIG. 3 shows the mapping in slightly different form, whereby it is clarified that signaling of the secondary information TFCI is only necessary with the mutual use of physical channels Phy CH by a number of services S1, S2, S3. If a service S1 or S2 or S3 uses a physical channel Phy CH exclusively, there is no need to signal the secondary information TFCI.

Figure 5:
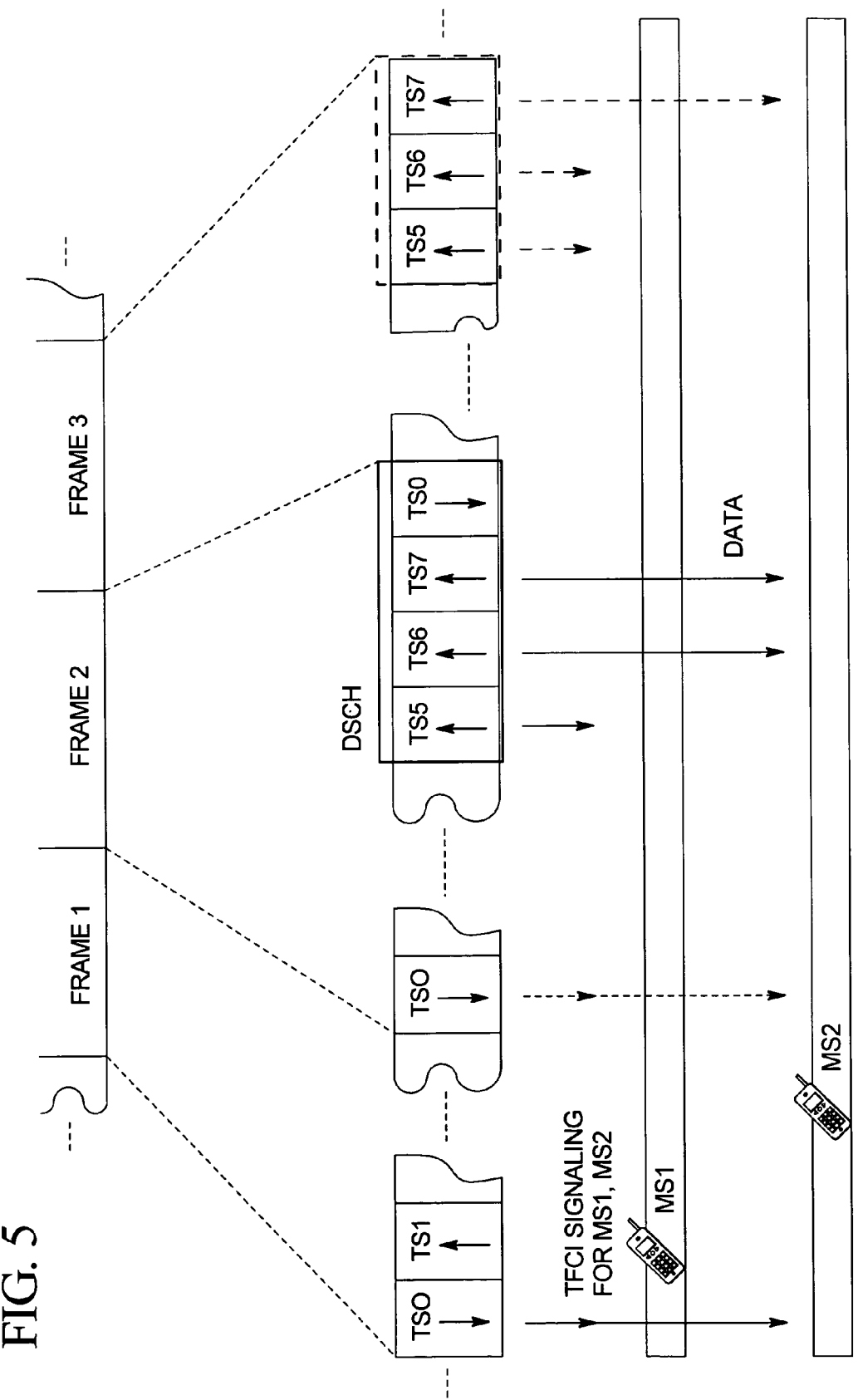
FIG. 5 shows a data transfer by frame with channel allocation according to the present invention.

The method according to the present invention shown in FIG. 5 presupposes that only two subscribers share the resources at the same time in one allocation period. This prevents resources remaining unused if there are small quantities of data for a subscriber station. This occurs, in particular, at the end of packet transfers, when residual quantities still have to be transferred but, on the other hand, data for a different subscriber waits for a subsequent transfer. There is no parallel distribution to a number of subscribers, as these can be serviced as before according to a time-multiplex method.

The respective data rates or the number of channels to be used is now signaled to the two subscriber stations. The total resources used, therefore, should not exceed the number of resources available in the shared channel. The one subscriber station now, for example, analyzes all the resources from 0 to its identified number of resources. The other subscriber station analyzes all resources from the highest available resource downwards to the signaled number of resources or the number of resources identified from the data rate.

An example (not shown) should clarify this further: The total data rate is, for example, 100 kB and resources 0-19 are available. The first subscriber station identifies a data rate of 20 KB, corresponding to 4 resources, and the second subscriber station identifies a data rate of 80 KB, corresponding to 16 resources. The first subscriber station then reads resources 0 to 3 and the second subscriber station resources 19 to 4.

It either can be determined beforehand for each subscriber station which subscriber station starts to read downwards or it can be signaled at the time via 1 bit of information to the respective subscriber station. With the next allocations, two different or even just one different subscriber station can, in turn, be contacted. It is not necessary here for the resources to form a continuous block.

The present invention is suitable for both the FDD mode and the TDD mode of the UMTS mobile radio system.

The method according to the present invention is disclosed in stages in FIG. 5 using a UMTS TDD 1.28 Mcps mobile radio system.

1. At the beginning, all the subscriber stations MS are informed that all resources are available in the time slots TS5 to TS7 of a time frame Frame as a mutually-used channel. The resources form what is known as a shared channel with a data rate of 30 kB, for example.
2. Data for the subscriber stations MS1 and MS2 is to be transferred in the time frame Frame 2, so the respective TFCI is transferred to both subscriber stations MS1, MS2 in a time frame Frame 1 before the transfer. The transfer can be effected via what is known as a common control channel or a dedicated channel. Signaling with details of the time of validity of the signaling is also possible.
3. The subscriber station MS1 identifies from the signaling a data rate of 10 kB for the time frame Frame 2 and that it should start to receive upwards from the lowest resource number. A data rate of 10 kB corresponds, for example, to a time slot TS. The subscriber station MS1 only reads TS5 in the time frame Frame 2.
4. The subscriber station MS2 identifies from the signaling a data rate of 20 kB for the time frame Frame 2 and that it should start downwards from the highest resource number to receive transmissions from the base station in a downward direction on these channels. The subscriber station MS2 reads the time slots TS7 and TS6 in the time frame Frame 2.

The configuration in the subsequent time frame Frame 3 can correspond to that of the time frame Frame 2 based on the signaling as shown with a broken line or can be modified to meet current requirements.

The present invention also can be used for a larger number of subscriber stations. Appropriate segmentation of the available channels and signaling of the start and direction can result in desirable resource-saving allocation. Thus, the sequence of channels in a shared channel can, for example, be divided into four starting points with identical directions. Signaling the starting point via 2 bits in the TFCI signaling message via four channel segments being individually allocated.

With one implementation of the method according to the present invention in a mobile radio system using FDD mode, instead of time slots or combinations of time slots and CDMA codes (TDD mode), defined channels are allocated by a respective CDMA code. A shared channel thereby includes a number of channels which are defined in a sequence known to the subscriber stations.

Although the present invention has been described with reference to specific embodiments, those of skill in the art will recognize that changes may be made thereto without departing from the spirit and scope of the present invention as set forth in the hereafter appended claims.

The invention claimed is:

1. A method for allocating channels in a radio communications system, wherein a data transfer occurs between a base station and subscriber stations via a radio interface, the method comprising:
providing that a shared channel, which can be used mutually by a plurality of the subscriber stations, include at least two channels which can be allocated to a plurality of connections existing in parallel for temporally successive use, with the channels being structured according to a sequence known to the subscriber stations;

allocating one of a data rate and the channels to be used in a shared channel to a designated subscriber station via a subscriber-individual signaling message; and signaling at least one of a starting point and a direction in the sequence to the designated subscriber station for selecting the channels, wherein a relationship is agreed upon between the allocated data rate and the allocated channels as a respective connection is set up in a separate signaling channel.

2. A method for allocating channels in a radio communications system as claimed in claim 1, the method further comprising the step of transferring a combination of data of a plurality of services, within at least one channel, within a connection between the base station and the designated subscriber station, wherein the combination, the allocated data rate and the allocated channels are signaled using values in the signaling message.

3. A method for allocating channels in a radio communications system as claimed in claim 1, wherein the data transfer occurs in a downward direction from the base station to the designated subscriber station.

4. A method for allocating channels in a radio communications system as claimed in claim 1, wherein individual data rates of services within a connection and the allocated channels are signaled in-band via a respective item of secondary information in the signaling message.

5. A method for allocating channels in a radio communications system as claimed in claim 1, wherein at least one of the signaling message, the starting point and the direction in the sequence is transferred in a dedicated channel.

6. A method for allocating channels in a radio communications system as claimed in claim 1, wherein at least one of the starting point and the direction in the sequence is transferred in a control channel.

7. A method for allocating channels in a radio communications system as claimed in claim 1, wherein at least one of the starting point and the direction in the sequence is respectively signaled to the designated subscriber station as an associated connection is set up.

8. A base station of a radio communications system for allocating channels, wherein a data transfer occurs between the base station and subscriber stations via a radio interface, the base station comprising:

transfer parts for transmitting a shared channel, that can be used mutually by a plurality of subscriber stations, which includes at least two channels for a plurality of connections existing in parallel for temporally successive use, with the channels being structured according to a sequence known to the subscriber stations; and signaling parts for transmitting a subscriber-specific signaling message to a designated subscriber station to allocate one of a data rate and the channels to be used in the shared channel, and to signal at least one of a starting point and a direction in the sequence for channel selection by the subscriber station, wherein a relationship is agreed upon between the allocated data rate and the allocated channels as a respective connection is set up in a separate signaling channel.

9. A subscriber station of a radio communications system for allocating channels, wherein a data transfer occurs between a base station and the subscriber station via a radio interface, the subscriber station comprising:

parts for receiving a shared channel transmitted from the base station that can be used mutually with further subscriber stations, the shared channel including at least two channels for a plurality of connections existing in parallel for temporally successive use, with the channels being structured according to a sequence known to the subscriber station; and parts for receiving a subscriber-specific signaling message to allocate one of a data rate and the channels to be used in the shared channel, and at least one of a signaled starting point and a direction in the sequence to select the channels, wherein a relationship is agreed upon between the allocated data rate and the allocated channels as a respective connection is set up in a separate signaling channel.

10. A radio communications system, comprising:

a base station for transmitting a shared channel, that can be used mutually by a plurality of subscriber stations, which includes at least two channels for a plurality of connections existing in parallel for temporally successive use, with the channels being structured according to a sequence known to the subscriber stations, for transmitting a subscriber-specific signaling message to a subscriber station, and for transferring at least one of a starting point and a direction in the sequence; and a subscriber station for receiving the shared channel, the subscriber-specific signaling message and the at least one of the signaled starting point and the direction in the sequence transmitted by the base station, wherein the subscriber-specific signaling message is used to allocate one of a data rate and the channels to be used in the shared channel, and the at least one of the signaled starting point and the direction in the sequence is used to select the channels, wherein a relationship is agreed upon between the allocated data rate and the allocated channels as a respective connection is set up in a separate signaling channel.

* * * * *